(No Model.)

W. HENDRICKSON.
PRINTER'S QUOIN.

No. 312,850. Patented Feb. 24, 1885.

WITNESSES:
Chas. Nida
C. Sedgwick

INVENTOR:
W. Hendrickson
BY Munn & Co
ATTORNEYS.

UNITED STATES PATENT OFFICE.

WILLIAM HENDRICKSON, OF BROOKLYN, NEW YORK.

PRINTER'S QUOIN.

SPECIFICATION forming part of Letters Patent No. 312,850, dated February 24, 1885.

Application filed May 7, 1884. (No model.)

*To all whom it may concern:*

Be it known that I, WILLIAM HENDRICKSON, of Brooklyn, in the county of Kings and State of New York, have invented a new and useful Improvement in Printers' Quoins, of which the following is a full, clear, and exact description, reference being had to the accompanying drawings, forming a part of this specification, in which similar letters of reference indicate corresponding parts in all the figures.

Figure 1:
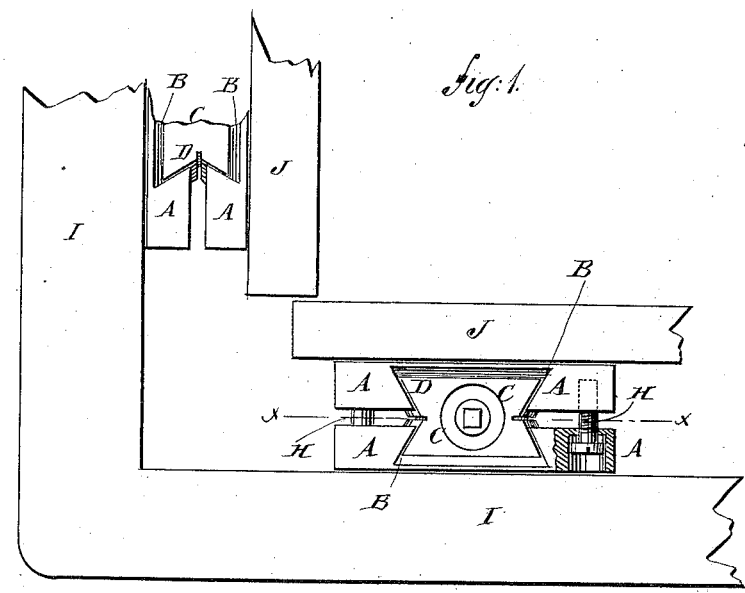
Figure 2:
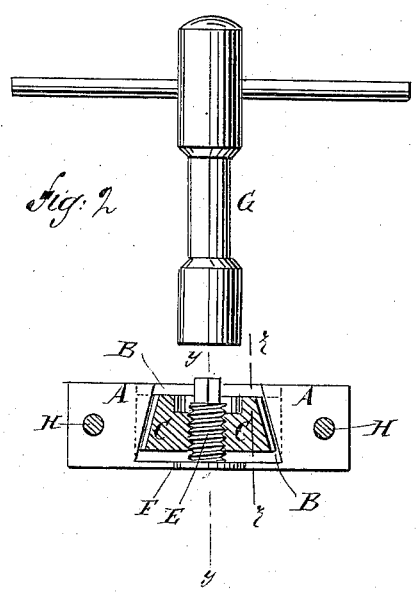
Figure 3:
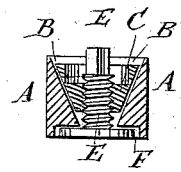
Figure 4:
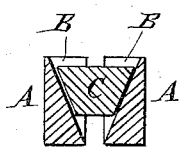

Figure 1 is a plan view, partly in section, of my improvement shown as applied to a chase. Fig. 2 is a sectional side elevation of the same taken through the line $x\ x$, Fig. 1. Fig. 3 is a sectional end elevation of the same taken through the line $y\ y$, Fig. 2. Fig. 4 is a sectional end elevation of the same taken through the line $z\ z$, Fig. 2.

The object of this invention is to facilitate the operation of locking up type.

The invention consists in a printer's quoin constructed with side pieces having inclined dovetailed side grooves, a wedge having inclined angular end grooves, and a swiveled screw whereby the said quoin can be readily expanded and contracted. The side pieces are connected and kept in place upon the wedge by guard-screws, as will be hereinafter fully described.

A represents the side pieces of the quoin in the inner sides of the middle parts of which are formed inclined dovetailed grooves B. Between the side pieces, A, is placed the wedge C, the sides of which are inclined to fit against the inclined bottoms of the grooves B. The ends of the wedge C have inclined angular grooves D formed in them, to fit against the inclined end shoulders of the grooves B, the said grooves and shoulders being so formed that the side pieces, A, will be firmly and squarely supported in whatever position the wedge C may be. Through the center of the wedge C is formed a screw-hole, to receive the screw E, and in the bottoms of the side pieces, A, is formed a recess, F, to receive the flat circular head of the screw E, so that the quoin can rest squarely upon its bottom. The upper end of the screw E is squared, to adapt it to be turned by a key, G. The side pieces, A, are connected at their ends by guard-screws H, the heads of which enter countersunk holes in one of the said side pieces, and which screw into holes in the other side piece, as shown in Fig. 1.

In using the quoins, they are inserted between the bar of the chase I and the side-sticks J, as shown in Fig. 1. The screws E are then turned by means of the key G, to force the wedge C downward between the side pieces, A, and thus force the said side pieces apart, securely locking up the type.

The quoins can be loosened when required, without any danger of disarranging the type, by turning the screws E in the other direction.

Having thus described my invention, I claim as new and desire to secure by Letters Patent—

A printer's quoin constructed substantially as herein shown and described, and consisting of the side pieces, A, having inclined dovetailed side grooves, B, the wedge C, having inclined angular end grooves, D, and the swiveled screw E, whereby the said quoin can be readily expanded and contracted, as set forth.

WILLIAM HENDRICKSON.

Witnesses:
 JAMES T. GRAHAM,
 EDGAR TATE.